US012404929B2

(12) United States Patent
Battles et al.

(10) Patent No.: US 12,404,929 B2
(45) Date of Patent: Sep. 2, 2025

(54) COOLANT TUBE SEAL

(71) Applicant: Freudenberg-NOK General Partnership, Plymouth, MI (US)

(72) Inventors: Darin Battles, Dahlonega, GA (US); Michael Blake, Northville, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 153 days.

(21) Appl. No.: 18/363,866

(22) Filed: Aug. 2, 2023

(65) Prior Publication Data
US 2025/0043864 A1    Feb. 6, 2025

(51) Int. Cl.
*F16J 15/02*      (2006.01)

(52) U.S. Cl.
CPC ................... *F16J 15/022* (2013.01)

(58) Field of Classification Search
CPC ........ F16J 15/022; F16J 15/024; F16J 15/025; F16J 15/3252; F16L 17/02; F16L 17/03; F16L 17/035; F16L 25/12; F16L 25/14; F16L 21/02; F16L 21/022
See application file for complete search history.

(56) References Cited

U.S. PATENT DOCUMENTS

| | | | | |
|---|---|---|---|---|
| 1,843,927 | A | * | 2/1932 | Manchester ........ F16L 27/0845 285/379 |
| 3,997,195 | A | * | 12/1976 | Bartholomew .......... F16L 37/05 285/915 |
| 12,188,561 | B2 | * | 1/2025 | Hernandez-Vazquez .................... F16J 15/3224 |
| 2009/0023056 | A1 | * | 1/2009 | Adams .................... B60L 58/25 29/890.035 |
| 2024/0125390 | A1 | * | 4/2024 | Hernandez-Vazquez .................... F16J 15/322 |

FOREIGN PATENT DOCUMENTS

WO    WO-2009037051 A2 *   3/2009 ............ F16L 21/005

* cited by examiner

*Primary Examiner* — Nicholas L Foster
(74) *Attorney, Agent, or Firm* — Harness, Dickey & Pierce, P.L.C.

(57) ABSTRACT

A tube seal assembly includes a nipple connected to a first fluid passage and a seal assembly connected to a second fluid passage. The seal assembly includes a cylindrical member attached to the second fluid passage and having a radially extending flange. A seal member includes a metal reinforcement with a cylindrical outer wall and a radially inwardly extending flange at a first end of the cylindrical outer wall. An over-molded seal body includes a locking feature on an interior surface of the cylindrical outer wall that engages the radially extending flange to retain the seal member to the cylindrical member. The over-molded seal body further includes a first sealing lip extending from the radially inwardly extending flange and received against an inner wall of the cylindrical member. An interior surface of the first sealing lip includes a sealing bead engaging the nipple.

7 Claims, 2 Drawing Sheets

COOLANT TUBE SEAL

FIELD

The present disclosure relates to a coolant tube seal.

BACKGROUND

This section provides background information related to the present disclosure which is not necessarily prior art.

Battery packs typically consist of multiple battery modules. Each module can include an enclosure with a group of battery cells. In order to prevent the temperature of the battery cells from becoming too high, the module often includes a radiator type cooling plate. Coolant is distributed thru the battery pack via a manifold. Two lines from the manifold (supply/return) would typically connect via nipples attached to the cooling plate. The purpose of the present disclosure is to provide an improved seal assembly between a battery pack cooling manifold and a battery module cooling plate. The current sealing solution consists of one or more O-rings and a pair of other components that position the O-ring(s) at the end of the tube assembly.

SUMMARY

This section provides a general summary of the disclosure, and is not a comprehensive disclosure of its full scope or all of its features.

According to an aspect of the present disclosure, a tube seal assembly is provided for connecting two fluid passages. The tube seal assembly includes a nipple connected to a first fluid passage and a seal assembly connected to a second fluid passage. The seal assembly includes a cylindrical member attached to the second fluid passage and having a radially extending flange. A seal member includes a metal reinforcement with a cylindrical outer wall and a radially inwardly extending flange at a first end of the cylindrical outer wall. An over-molded seal body includes a locking feature on an interior surface of the cylindrical outer wall that engages the radially extending flange to retain the seal member to the cylindrical member. The over-molded seal body further includes a first sealing lip extending from the radially inwardly extending flange and received against an inner wall of the cylindrical member. An interior surface of the first sealing lip includes a sealing bead engaging the nipple.

According to another aspect, the over-molded seal body includes a second sealing lip extending from a second end of the cylindrical outer wall of the metal reinforcement and engaging the cylindrical member.

According to another aspect, the second sealing lip extends radially inwardly at an angle from the second end of the cylindrical outer wall of the metal reinforcement.

According to another aspect, the over-molded seal body includes a third sealing lip extending from the radially inwardly extending flange of the metal reinforcement in a direction opposite to the first sealing lip.

According to another aspect, the third sealing lip extends radially outwardly at an angle from the radially inwardly extending flange of the metal reinforcement.

According to another aspect, the sealing bead of the first sealing lip includes a pair of sealing beads engaging the nipple.

According to another aspect, the pair of sealing beads are compressed against the nipple.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
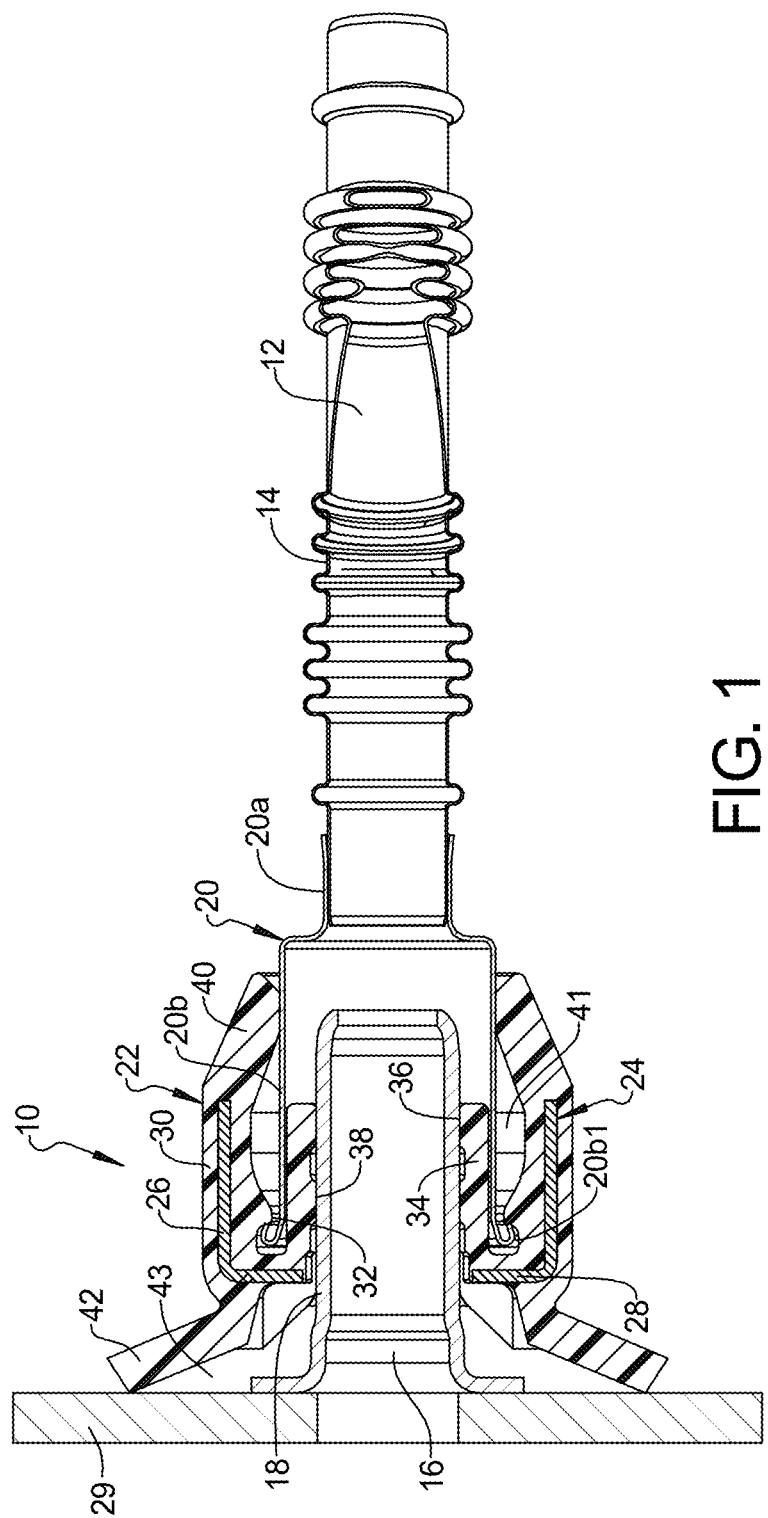
FIG. 1 is a cross-sectional view of a tube seal assembly according to the principles of the present disclosure.
Figure 2:
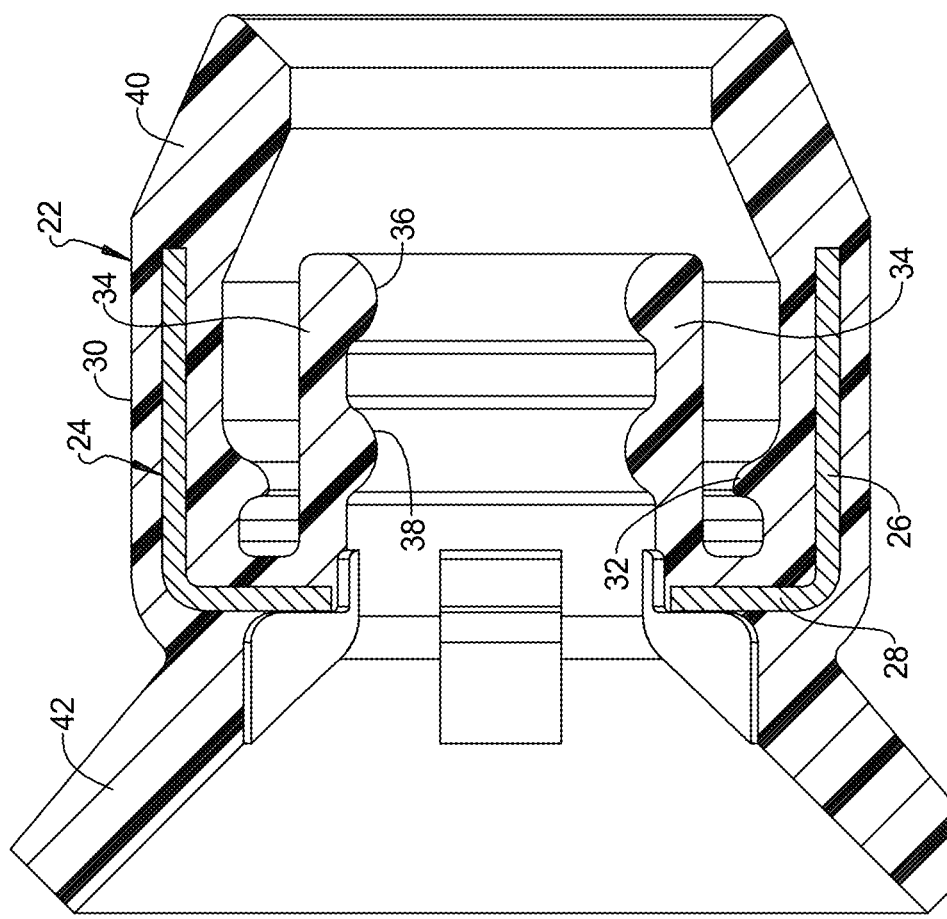
FIG. 2 is a cross-sectional view of the seal member according to the principles of the present disclosure.

With reference to FIGS. 1 and 2, a tube seal assembly 10 will now be described. With reference to FIG. 1, the tube seal assembly 10 provides a connection between a first fluid passage 12 through a tube 14 and a second fluid passage 16 through a nipple 18. An attachment member 20 includes a first cylindrical portion 20a that can be crimped to the tube 14 and includes a second cylindrical portion 20b radially outwardly extending flange 20b1 at a second end. Alternatively, the cylindrical member can be formed as a one-piece design with an end of the tube 14. A seal member 22 includes a cup-shaped metal reinforcement 24 with a cylindrical outer wall 26 and a radially inwardly extending flange 28 at a first end of the cylindrical outer wall 26. The nipple 18 can be mounted to a radiator cooling plate 29 or other structure.

A seal body 30 is over-molded on the cup-shaped metal reinforcement 24 and includes a locking feature 32 in the form of a raised rib extending radially inward from an interior surface of the cylindrical outer wall 26. The locking feature 32 engages the radially extending flange 20b of the attachment member 20 to retain the seal member 22 to the attachment member 20. The seal body 30 further includes a first sealing lip 34 extending from the radially inwardly extending flange 28 and received against an inner wall of the second cylindrical portion 20b of the attachment member 20. An interior surface of the first sealing lip 34 includes a pair of annular sealing beads 36, 38 for sealingly engaging the nipple 18. It should be understood that a single sealing bead 36 can be used or that a larger number of sealing beads can be used. The pair of sealing beads 36, 38 are compressed against the nipple 18 by the second cylindrical portion 20b of the attachment member 20.

The seal body 30 includes a second sealing lip 40 extending from a second end of the cylindrical outer wall 26 of the metal reinforcement 24 and engaging the attachment member 20. The second sealing lip 40 extends radially inwardly at an angle of less than 45 degrees from the second end of the cylindrical outer wall 26 of the metal reinforcement 24. The second sealing lip 40 seals radially onto the attachment member 20 of the tube to prevent hot gases and particles from reaching the primary coolant sealing lips 36, 38 that engage the nipple 18. The second sealing lip 40 defines a dead air space 41 interior of the seal member to provide further thermal isolation for the inner sealing lips 36, 38.

The seal body 30 further includes a third sealing lip 42 extending from the radially inwardly extending flange 28 of the metal reinforcement 24 in a direction opposite to a direction of the first sealing lip 34. The third sealing lip 42 extends radially outwardly at an angle of approximately 45 degrees from the radially inwardly extending flange 28 of the metal reinforcement 24. The third sealing lip 42 can press against the radiator cooling plate 29 and flare outward when installed, creating a seal to prevent hot particles and gasses from reaching the inner sealing beads. The third sealing lip 42 defines a dead air space 43 interior of the third sealing lip 42 to provide further thermal isolation for the inner sealing lips 36, 38. The flared third sealing lip 42 also aids in aligning the seal assembly 10 with the nipple 18 during assembly.

The improved seal assembly 10 includes a single piece elastomer 30 with a bonded metallic reinforcement 24. The proposed seal assembly 10 provides better protection of the sealing element during the occurrence of a thermal event within the battery pack. In addition, the proposed seal assembly 10 consolidates the function of multiple current components into a single component. The proposed seal assembly 10 includes a primary coolant seal 36 and a secondary backup coolant seal 38. The second sealing lip 40 and the third sealing lip 42 provide a continuous external barrier to prevent hot gases from reaching the primary and secondary coolant seals 36, 38.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tube seal assembly for connecting two fluid passages, comprising:
  a nipple connected to a first fluid passage; and
  a seal assembly connected to a second fluid passage, the seal assembly including:
  an attachment member attached to the second fluid passage and having a radially extending flange,
  a seal member includes a metal reinforcement with a cylindrical outer wall and a radially inwardly extending flange at a first end of the cylindrical outer wall, an over-molded seal body including a locking feature, the over-molded seal body positioned on an interior surface of the cylindrical outer wall and engaging the radially extending flange of the attachment member to retain the seal member to the attachment member, the over-molded seal body further includes a first sealing lip extending from the radially inwardly extending flange and received against an inner wall of the attachment member, an interior surface of the first sealing lip including a sealing bead engaging the nipple.

2. The tube seal assembly according to claim 1, wherein the over-molded seal body includes a second sealing lip extending from a second end of the cylindrical outer wall of the metal reinforcement and engaging the attachment member.

3. The tube seal assembly according to claim 2, wherein the second sealing lip extends radially inwardly at an angle from the second end of the cylindrical outer wall of the metal reinforcement.

4. The tube seal assembly according to claim 2, wherein the over-molded seal body includes a third sealing lip extending from the radially inwardly extending flange of the metal reinforcement in a direction opposite to the first sealing lip.

5. The tube seal assembly according to claim 4, wherein the third sealing lip extends radially outwardly at an angle from the radially inwardly extending flange of the metal reinforcement.

6. The tube seal assembly according to claim 1, comprising a second sealing bead on the interior surface of the first sealing lip, the second sealing bead engaging the nipple.

7. The tube seal assembly according to claim 6, wherein the sealing beads are compressed against the nipple.

* * * * *